US006893149B2

(12) United States Patent
Mock et al.

(10) Patent No.: US 6,893,149 B2
(45) Date of Patent: May 17, 2005

(54) LAMP SOCKET AS WELL AS ASSEMBLY CONSISTING OF A LAMP SOCKET AND A REFLECTOR

(75) Inventors: Ralf Mock, Hochspeyer (DE); Olaf Rottstädt, Tabarz (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 73 days.

(21) Appl. No.: 10/266,376

(22) Filed: Oct. 8, 2002

(65) Prior Publication Data

US 2003/0117811 A1 Jun. 26, 2003

(30) Foreign Application Priority Data

Oct. 9, 2001 (DE) .................................... 201 16 523 U

(51) Int. Cl.[7] .................................................. B60Q 1/00
(52) U.S. Cl. ........................ 362/519; 362/548; 362/226
(58) Field of Search ................................ 362/226, 268, 362/519, 548, 549, 288

(56) References Cited

U.S. PATENT DOCUMENTS 4,920,463 A * 4/1990 Montet ....................... 362/519
5,711,597 A * 1/1998 Unno ......................... 362/226

* cited by examiner

*Primary Examiner*—Stephen Husar
(74) *Attorney, Agent, or Firm*—Tarolli, Sundheim, Covell & Tummino L.L.P.

(57) ABSTRACT

A lamp socket for a bulb has two latching hooks by means of which the lamp socket can be latched into place at a reflector, and that a spring, which can abut at the lighting means.

13 Claims, 12 Drawing Sheets

LAMP SOCKET AS WELL AS ASSEMBLY CONSISTING OF A LAMP SOCKET AND A REFLECTOR

This invention relates to a lamp socket for a lighting means

BACKGROUND OF THE INVENTION

The lamp socket is usually provided for being mounted on a reflector, so that the lighting means is correctly positioned with respect to the focal position of the reflector. In particular when the lamp formed of lamp socket and reflector is used in a motor vehicle, the lamp socket must satisfy high requirements as regards the vibration resistance. Only when the lighting means is safely retained in its position even in the case of vibrations is it ensured that there is no flickering of light.

From the prior art, the so-called clip lock is known, wherein a metal clip is used for locking the bulb at the reflector. There is also known a bayonet lock, wherein the bulb is inserted in a lamp socket. The lamp socket is then inserted in the reflector and rotated through a certain angle, so that it snaps into place.

It is the object of the invention to create a simple and inexpensive lamp socket which ensures a safe positioning of the lighting means.

BRIEF DESCRIPTION OF THE INVENTION

The invention provides a lamp socket which has two latching hooks by means of which the lamp socket can be locked into place at a reflector, as well as a spring which can be abut at the lighting means The lamp socket is inserted into the reflector along the longitudinal direction of the lighting means and is held there by the latching hooks. The spring ensures that the lamp socket is always in its correct position, even if vibrations occur.

In accordance with a preferred embodiment of the invention, the two latching hooks are formed opposite each other, and each latching hook is provided with a plurality of ribs which form a gripping portion. In this aspect, the two latching hooks of the lamp socket can easily be seized, slightly be pressed together and be inserted into the reflector.

Preferably, a stop is provided at the lamp socket for each latching hook This ensures that the latching hooks are not bent excessively when they are seized and pressed together, in particular not beyond their elastic region. If the latching hooks were bent to such an extent that they undergo a plastic deformation, it could no longer be ensured that the lamp socket is reliably locked into place at the reflector.

In accordance with the preferred embodiment it is provided that the spring is provided with two spring legs This allows to symmetrically support the lamp socket at the reflector in cooperation with the two opposed latching hooks.

Preferably, at least one guiding groove is provided for each spring leg. This guiding groove offers a protective function in particular during the transport of the lamp socket and prevents the spring legs from being distorted.

In accordance with one embodiment of the invention it is provided that the spring has a connecting lug, so that it serves as a plug-in contact for connecting the lighting means, and that a second plug-in contact is provided. This embodiment is particularly useful when the lighting means is an H1 bulb, in which the contacts are formed by a contact plate and a contact lug The contact lug can be plugged into the plug-in contact, and the contact plate rests against the two spring legs However, when the lighting means is an H7 bulb which is provided with two contact lugs, two plug-in contacts are provided, into which the contacts of the H7 bulb can be plugged.

Advantageous aspects of the invention can be taken from the sub-claims.

BRIEF DESCRIPTION OF THE DRAWINGS

The invention will subsequently be described with reference to two preferred embodiments which are represented in the attached drawings, in which.

DETAILED DESCRIPTION OF THE INVENTION

Figure 1:
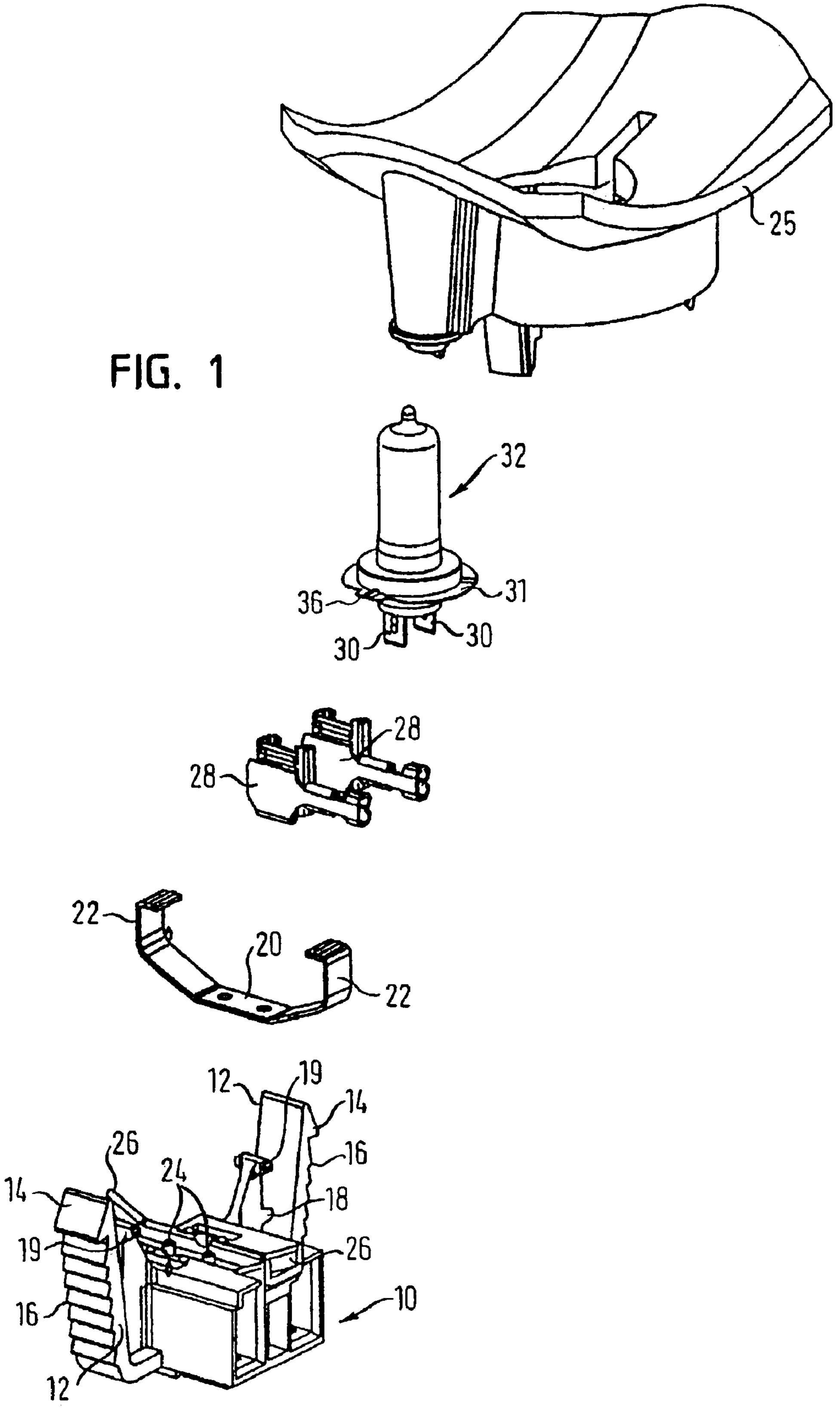
FIG. 1 shows a lamp socket with reflector in accordance with a first embodiment in a perspective exploded view.
Figure 2:
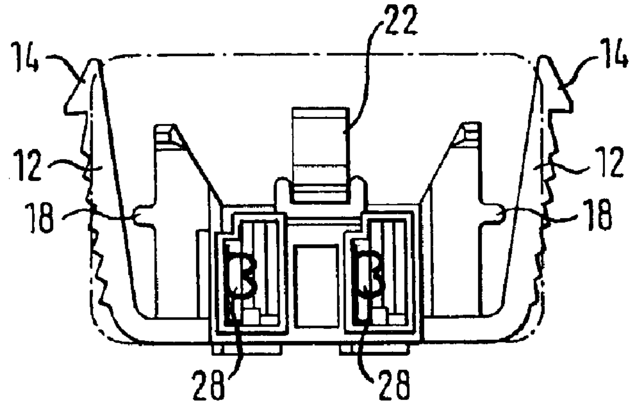
FIG. 2 shows the lamp socket of FIG. 1 in a side view.
Figure 3:
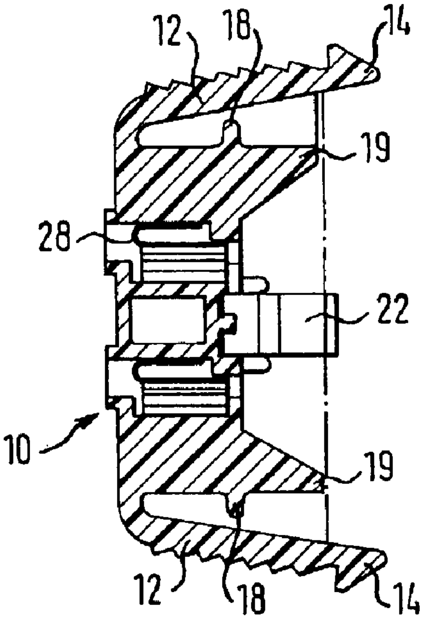
FIG. 3 shows the lamp socket of FIG. 1 in a section along the plane III—III of FIG. 6.
Figure 4:
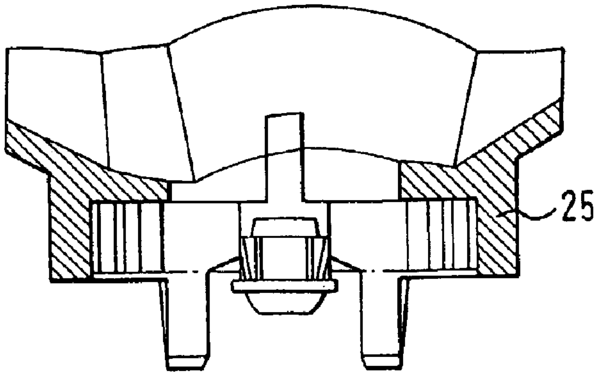
FIG. 4 shows the reflector of FIG. 1 in a section along the plane IV—IV of FIG. 7.
Figure 5:
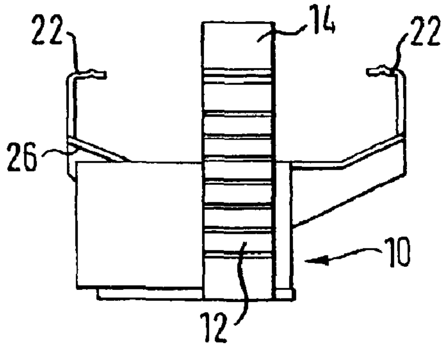
FIG. 5 shows the lamp socket of FIG. 1 in another side view.
Figure 6:
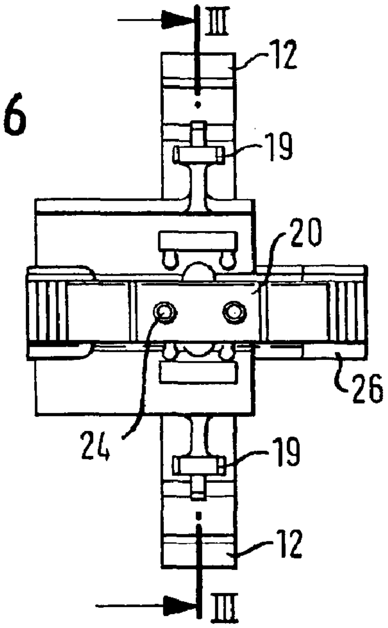
FIG. 6 shows the lamp socket of FIG. 1 in a top view.
Figure 7:
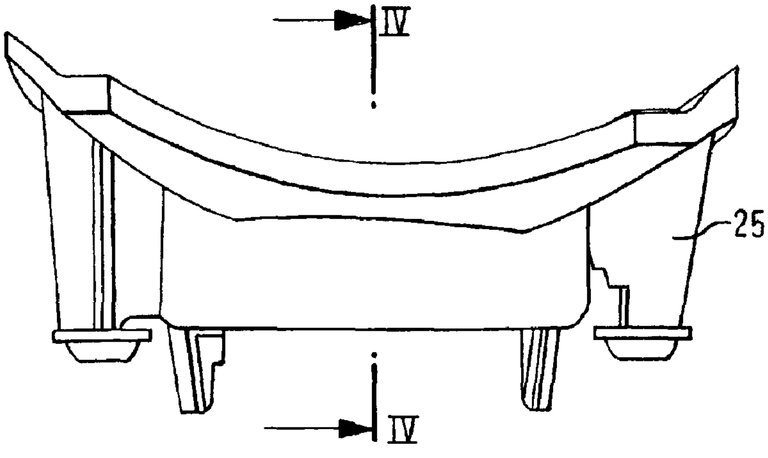
FIG. 7 shows the reflector of FIG. 1 in a side view.

FIGS. 1 to 7 show a lamp socket in accordance with a first embodiment together with the associated bulb and a reflector.

The lamp socket 10 is a plastic body from which two latching hooks 12 extend. The two latching hooks are disposed on sides of the body facing away from each other and are integrally formed therewith. At its free end, each latching hook has a latching nose 14 and is centrally provided with a gripping portion which is formed by a plurality of ribs 16. The ribs allow to seize the latching hooks 12 with two fingers and press the same together. The plastic body is provided with two stops 18, which prevent the two latching hooks 12 from being pressed together excessively far. Two T-shaped ends 19 at the lamp socket similarly act as protection against excessive compression At the plastic body, a spring 20 is mounted, which is provided with two spring legs 22. The spring legs 22 serve to rest against an abutment surface of a reflector 25 and urge the lamp socket into a reference position The spring 20 is attached to the plastic body of the lamp socket 10 by two hot-caulked plastic pins 24 which extend through openings in the spring 20.

Furthermore, two guiding grooves 26 are formed at the plastic body, which enclose the spring legs 22 with a small spacing The guiding grooves 26 offer a mechanical protection for the spring legs, so that the same cannot be distorted during the transport of the lamp socket.

In the plastic body of the lamp socket 10 two plug-in contacts 28 are provided, into which two contact lugs 30 of a lighting means 32 can be plugged. In the illustrated embodiment, the lighting means is an H7 bulb, in which the two contact lugs 30 extend in parallel to each other at a distance and which has a base plate 31. The plug-in contacts 28 are mounted at the plastic body such that their crimped portions used for connecting cables extend at right angles to the longitudinal axis of the bulb The plug-in contacts 28 are retained in the plastic body by means of a latching connection.

For mounting the bulb, the same is inserted into the plug-in contacts 28 with its contact lugs 30, the spring legs 22 resting against the base plate 31 A positioning nose 36 at the bulb ensures that the same can be mounted at the reflector only in a single position. Then, the latching hooks 12 are pressed together, the lamp socket 10 is inserted into the reflector, and the latching hooks 12 are released, so that the latching nose 14 rests against an associated holding surface 34 at the reflector In this condition, the spring legs 22 urge the lamp socket 10 away from the reflector via the base plate 31, so that the lamp socket is reliably held in a reference position.

FIGS. 8 to 14 show a lamp socket in accordance with a second embodiment As far as in the second embodiment components are used which are known from the first embodiment, the same reference numerals are used, and in so far reference is made to the above explanations.

Figure 8:
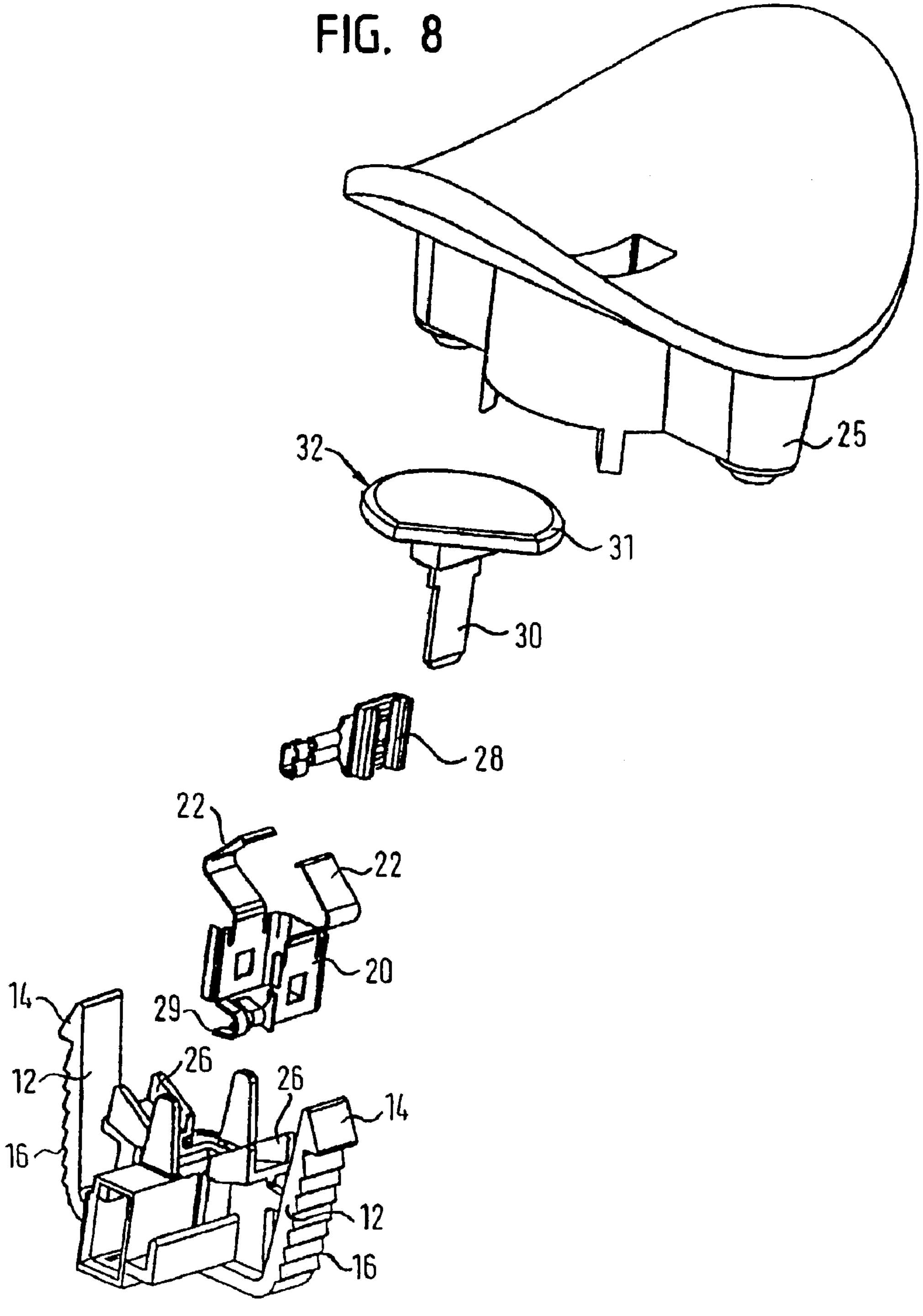
FIG. 8 shows a lamp socket with reflector in accordance with a second embodiment in a perspective exploded view.
Figure 9:
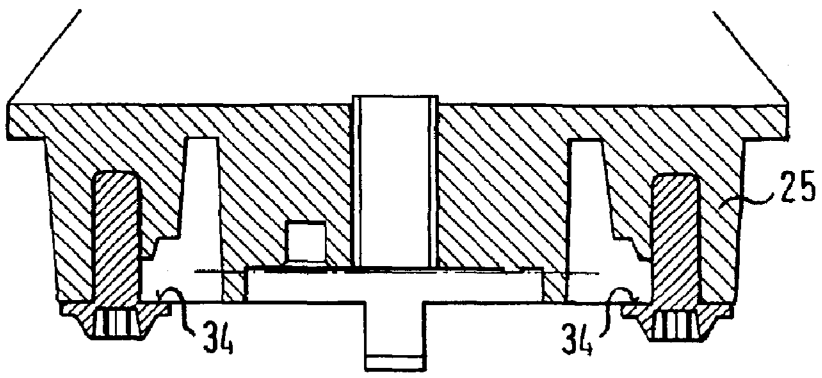
FIG. 9 shows the reflector of FIG. 8 in a section along the plane IX—IX of FIG. 14.
Figure 10:
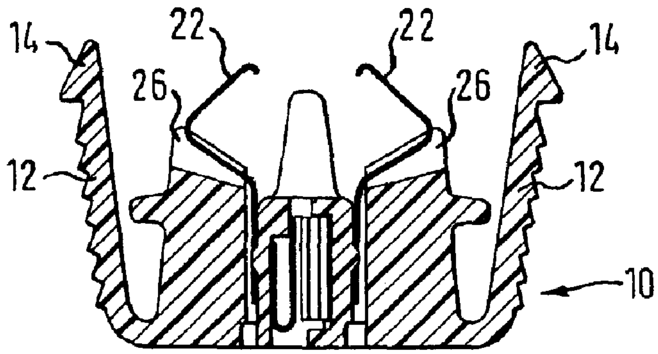
FIG. 10 shows the lamp socket of FIG. 8 in a section along the plane X—X of FIG. 13.
Figure 11:
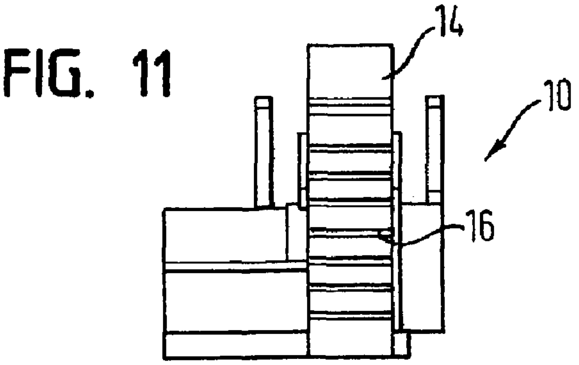
FIG. 11 shows the lamp socket of FIG. 8 in a side view.
Figure 12:
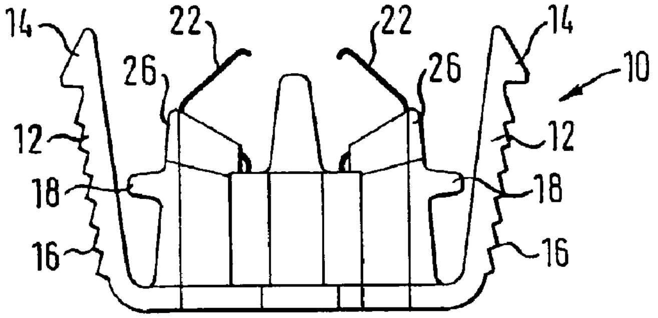
FIG. 12 shows the lamp socket of FIG. 8 in another side view.
Figure 13:
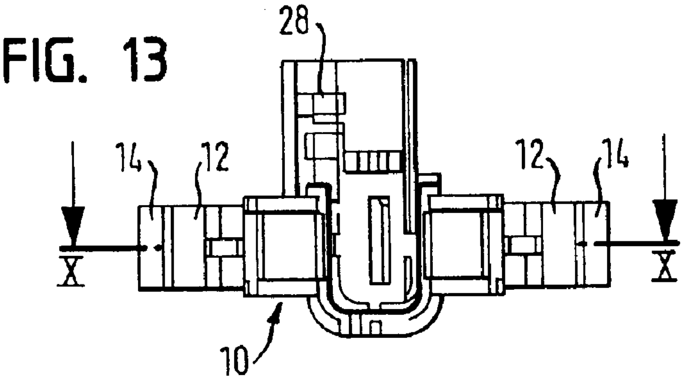
FIG. 13 shows the lamp socket of FIG. 8 in a bottom view.
Figure 14:
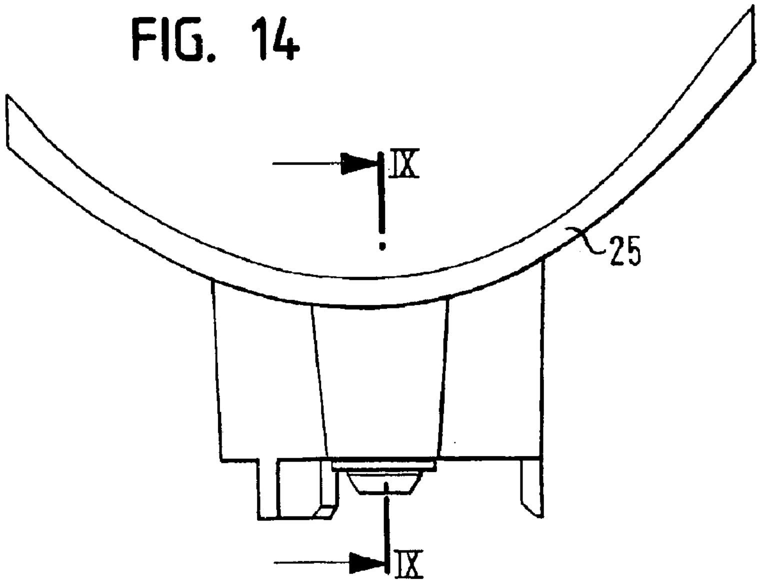
FIG. 14 shows the reflector of FIG. 8 in a side view.

The most essential difference between the first and the second embodiment consists in that the lamp socket of the second embodiment is provided for an H1 bulb, which is only indicated in FIG. 8. The H1 bulb has a single, centrally disposed contact lug 30, and the second contact is realized by the base plate 31, which therefore acts as contact plate.

The plug-in contact 28 is disposed centrally in the plastic body of the lamp socket 10. In the second embodiment, instead of a second plug-in contact, the spring 20 is designed for contacting the bulb, in that it is provided with a connecting lug 29 to which a cable can be connected in the same way as in the first embodiment, the spring 20 rests against the bottom surface of the contact plate 31 of the H1 bulb In the second embodiment, too, the spring legs 22 of the spring 20 serve to urge the lamp socket 10 into a reference position relative to the reflector 25.

Figure 15:
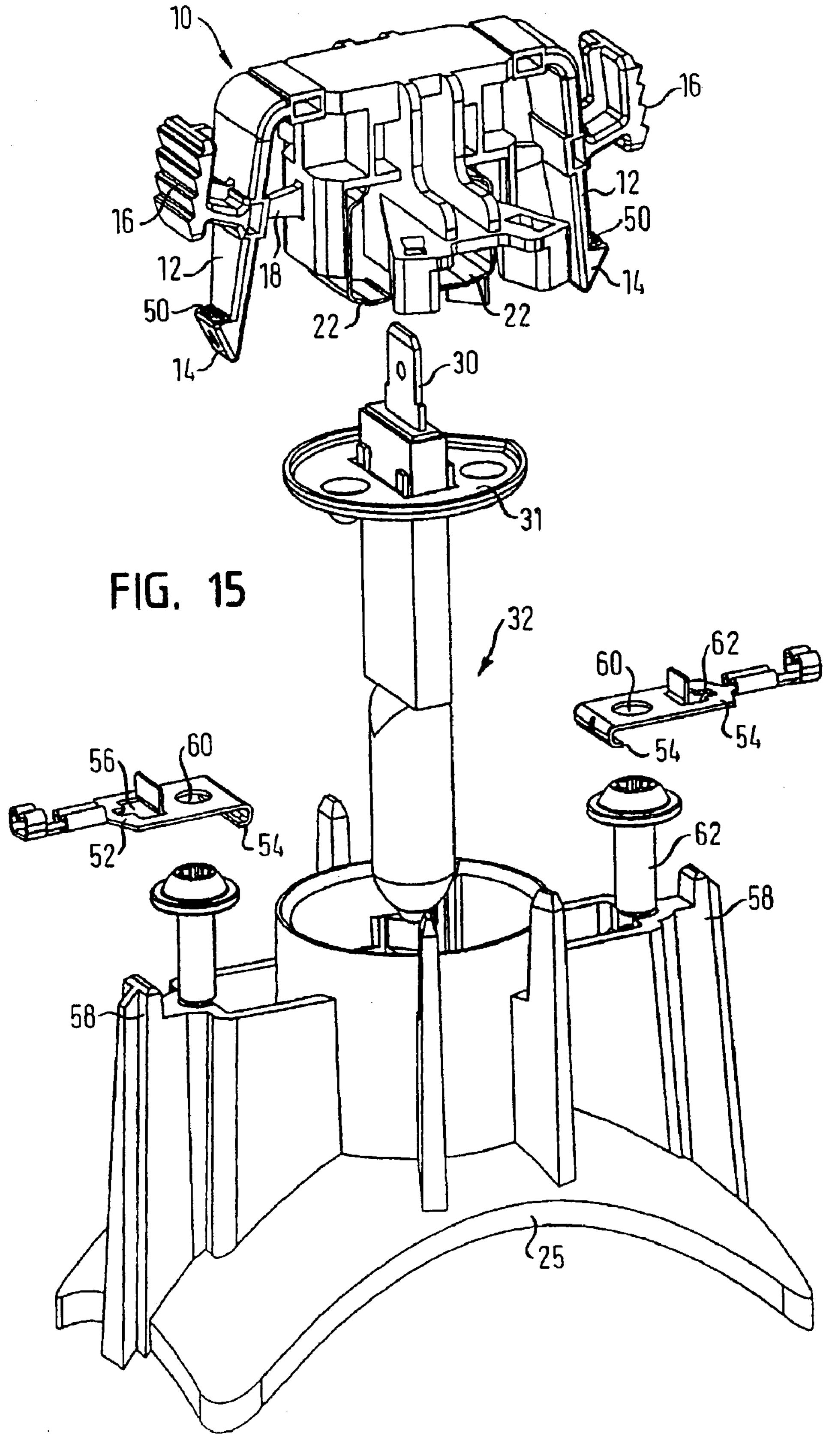
FIG. 15 shows a lamp socket with reflector in accordance with a third embodiment in a perspective exploded view.

FIG. 15 shows a lamp socket with reflector in accordance with a third embodiment. For the components known from the first and second embodiments, the same reference numerals are used, and in so far reference is made to the above explanations.

In the third embodiment, too, an H1 bulb is used as lighting means. The most essential difference with respect to the second embodiment consists in that the cables for contacting the lighting means 32 are connected to the reflector, rather than to the lamp socket 10.

At each latching hook 12, the lamp socket 10 is provided with an electrically conductive connecting plate 50 which is disposed on the surface of the latching nose 14 by means of which the lamp socket is locked into place at the reflector One of the connecting plates 50 is electrically connected to the plug-in contact 28, into which the contact lug 30 of the lighting means 32 is plugged The other one of the connecting plates 50 is in electrically conductive connection with one of the two spring legs 22, both of which engage the base plate 31 of the lighting means 32.

Instead of the holding surfaces 34, two latching contacts 52 are mounted at the reflector 25, which are bent over at their front ends facing away from the crimped portion for a cable, so that a latching surface 54 is formed in each case, against which the two connecting plates 50 of the lamp socket may rest. The latching contacts 52 each have a recess 56 for the engagement of a suitably shaped positioning nose 58 on the reflector 25, and a hole 60 through which a fastening screw 62 extends which is screwed into the reflector 25. This ensures that each latching contact 52 is precisely aligned and reliably secured to the reflector 25.

For mounting the lighting means 32, the same is plugged into the lamp socket 10. Then, the two latching arms 12 of the lamp socket are pressed together by applying pressure on the ribs 16, so that the latching arms 14 can be inserted into the reflector 25. As soon as the latching arms 14 are released, they will automatically return elastically outwards, so that the connecting plates 50 rest against the latching surfaces 54. The required contact force is applied by the spring legs 22.

Figure 16:
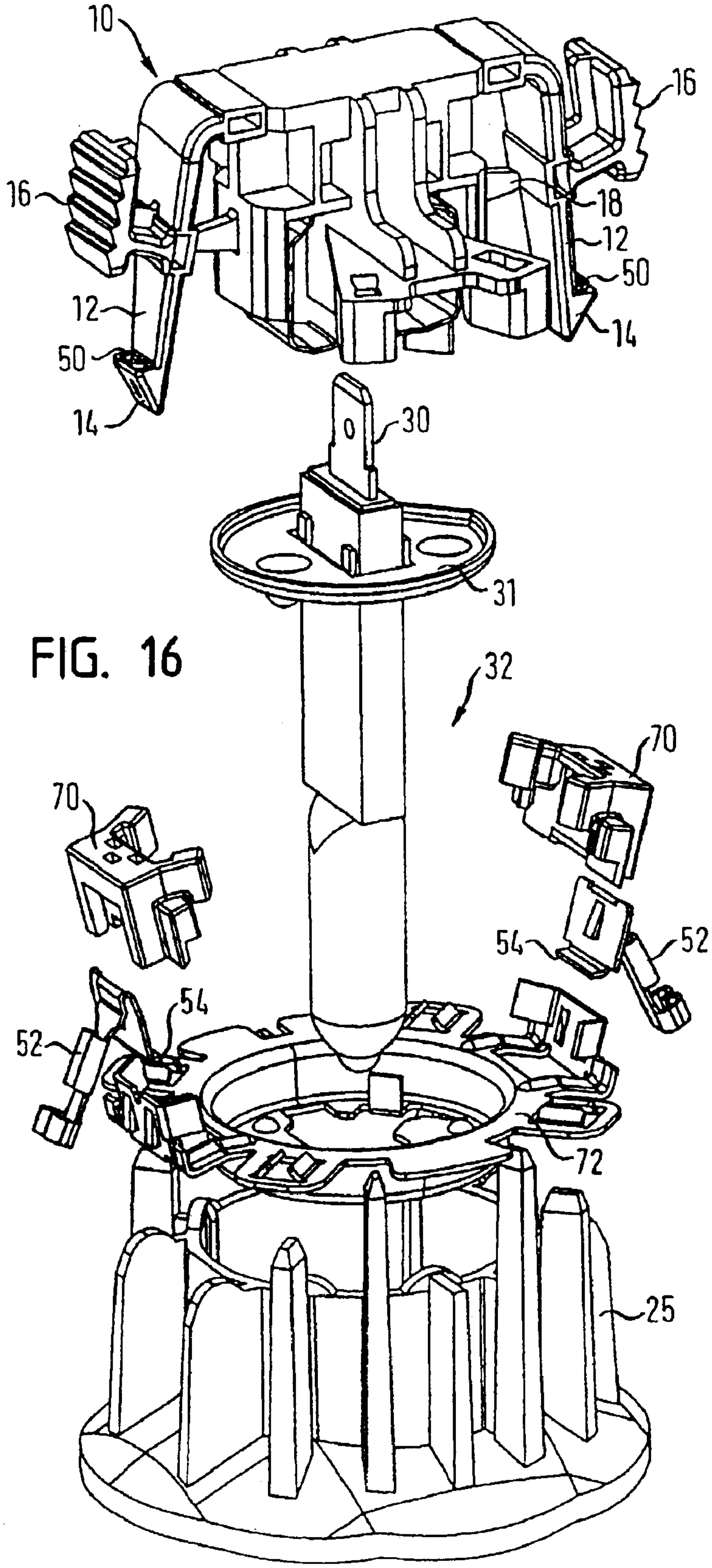
FIG. 16 shows a lamp socket with reflector in accordance with a fourth embodiment in a perspective exploded view.
Figure 17:
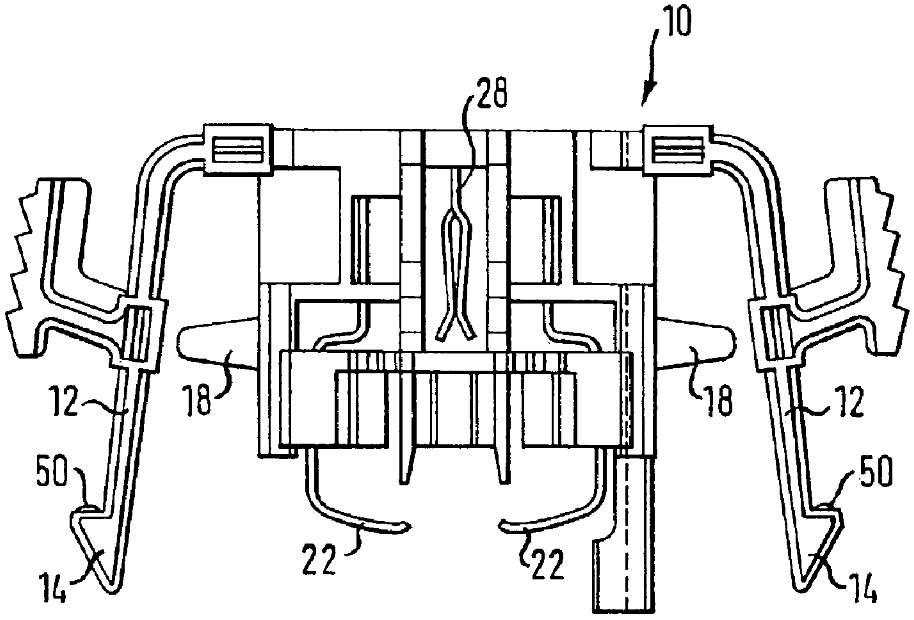
FIG. 17 shows the lamp socket used in the third and fourth embodiments in a side view.

The embodiment shown in FIG. 16 differs from the embodiment shown in FIG. 15 essentially merely by the design of the latching contacts 52. Here, the latter are not screwed horizontally onto the reflector 25, but are received in a holding part 70 which is slipped onto a sheet metal part 72 at the reflector. In this case, too, latching surfaces 54 are provided, which are engaged by the connecting plates 50 when the lamp socket 10 has been mounted at the reflector 25.

Figure 18:
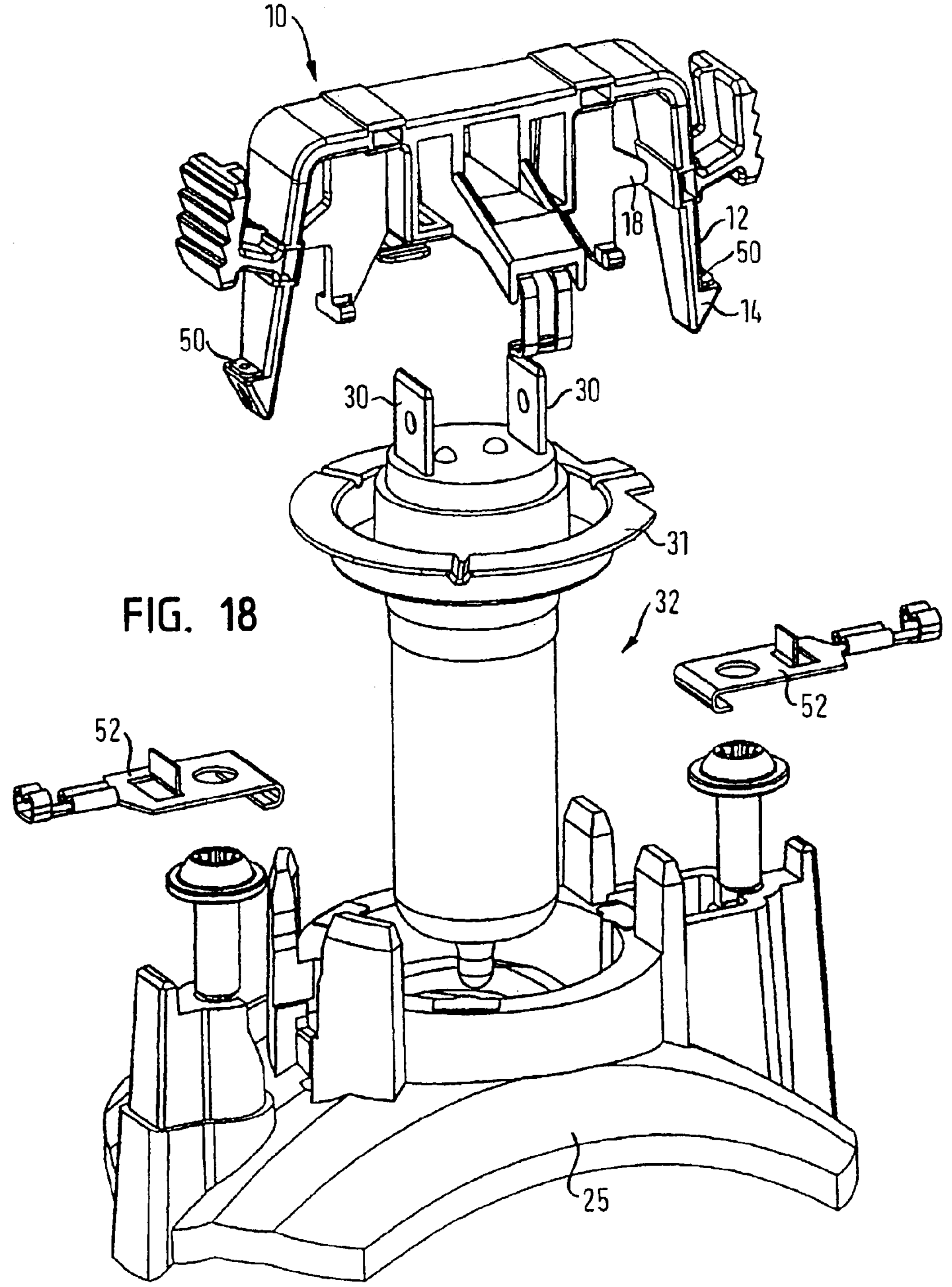
FIG. 18 shows a lamp socket with reflector in accordance with a fifth embodiment in a perspective exploded view.
Figure 19:
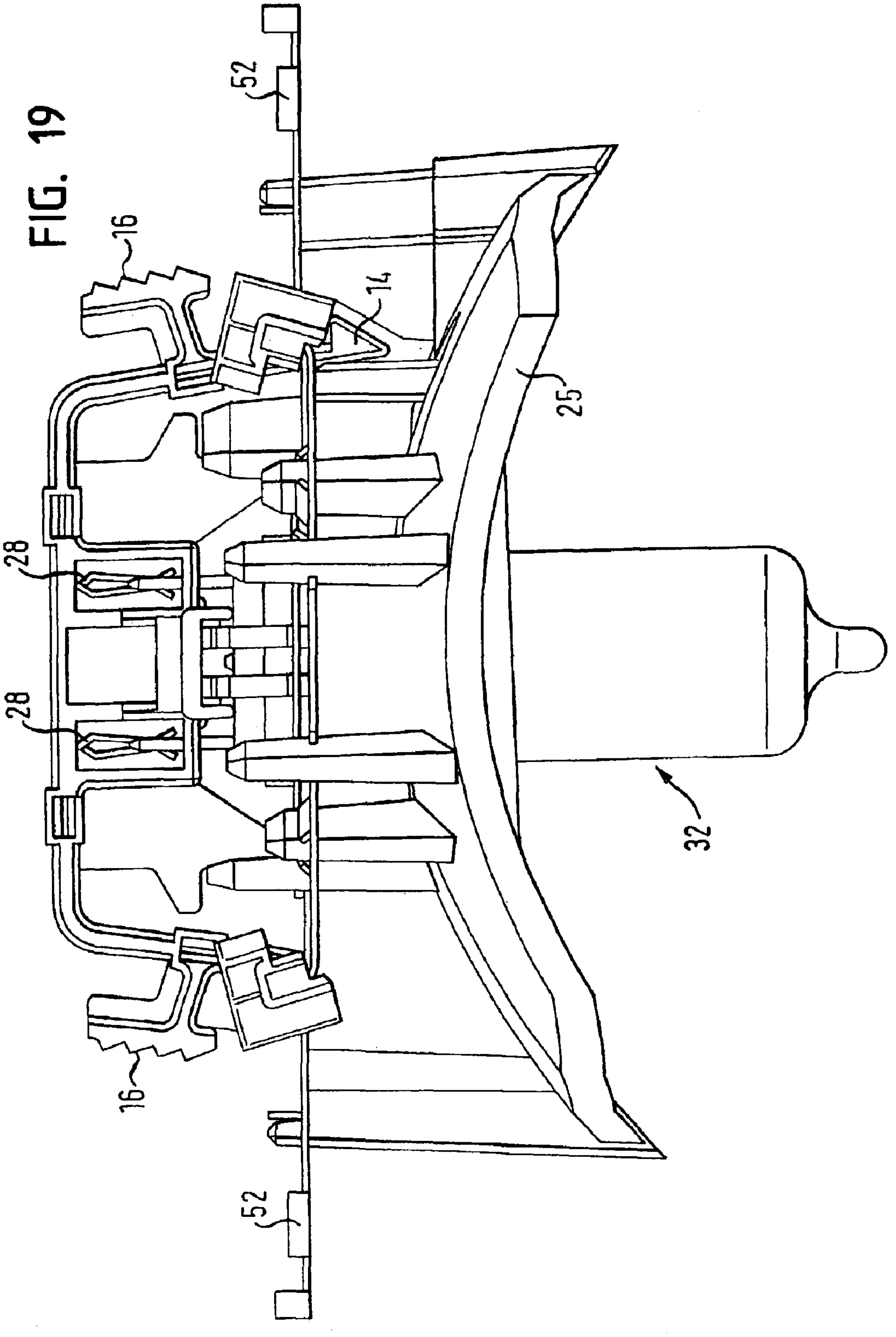
FIG. 19 shows the lamp socket with reflector of FIG. 18 in a side view.

The embodiment of FIG. 18 essentially corresponds to the embodiment shown in FIG. 15 as regards the kind of contacting of the lighting means 32; in this embodiment, however, an H7 bulb is used as lighting means. This H7 bulb is provided with two contact lugs 30, which are plugged into respective plug-in contacts 28 (see FIG. 19). Each of the plug-in contacts 28 is in electrically conductive connection with a connecting plate 50, which is mounted at a latching nose 14 of a latching arm 12 of the lamp socket 10. When mounting of the lamp socket 10 at the reflector 25 is completed, the connecting plates 50 rest against the latching surfaces 54 at the bottom side of the latching contacts 52, so that a current path is formed from one of the latching contacts 52 via its associated connecting plate 50, the conductor sealed in the latching arm 12 towards one of the plug-in contacts 28, then through the lighting means 32 to the other plug-in contact 28, the conductor sealed in the latching arm 12 and to the second connecting plate 50 and from there into the other latching contact 52.

Figure 20:
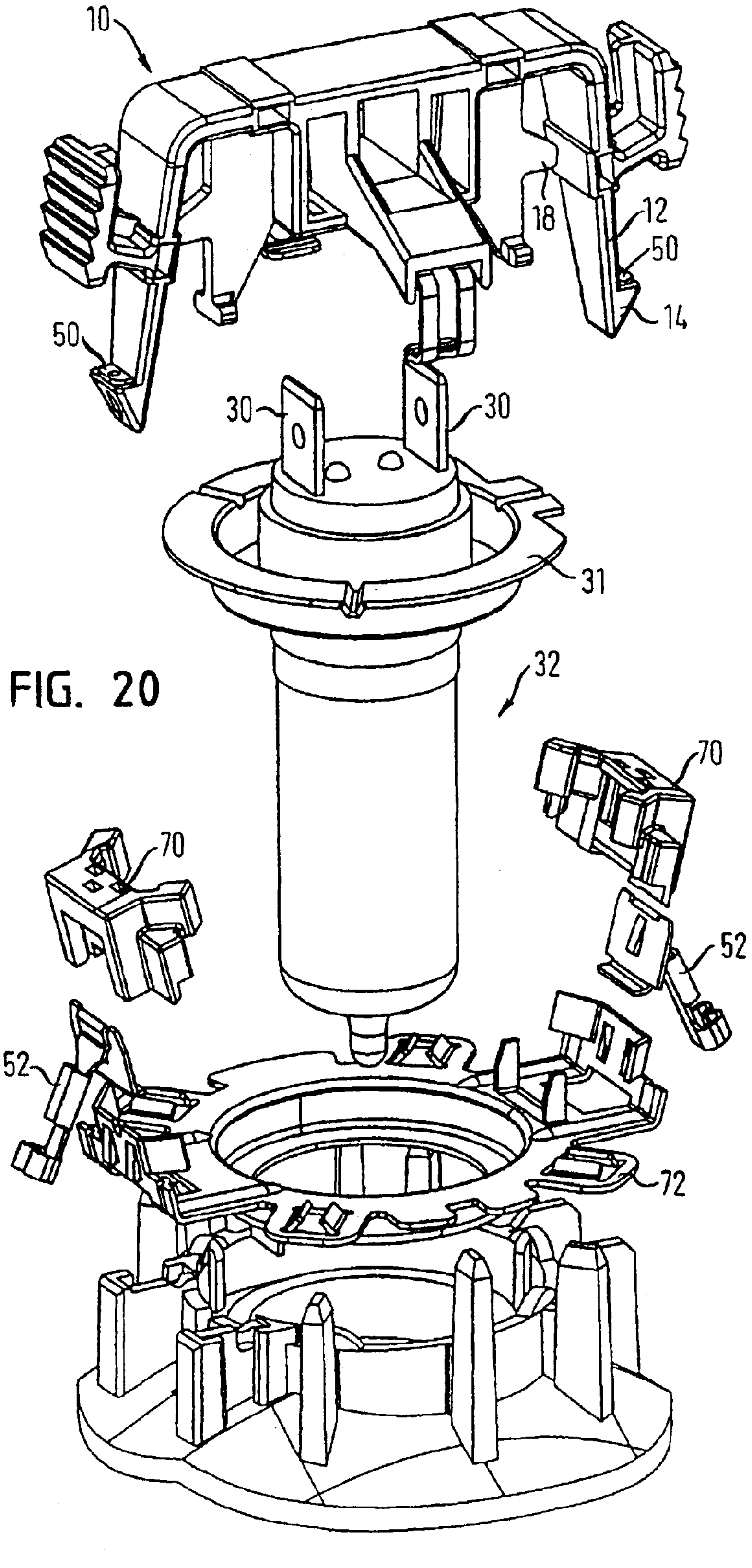
FIG. 20 shows a lamp socket with reflector in accordance with a sixth embodiment in a perspective exploded view.

The embodiment according to FIG. 20 essentially corresponds to that of FIG. 16, an H7 bulb being used here as lighting means in the same way as in the embodiment according to FIG. 18. In this embodiment, too, connecting plates 50 engaging latching contacts 52 are used at the lamp socket 10.

What is claimed is:

1. A lamp assembly comprising:

a reflector;

a lamp socket, said lamp socket including a plurality of latching hooks, said latching hooks cooperating with said reflector to latch said lamp socket to said reflector;

a lighting device received by said lamp socket; and a spring abutting said lighting device to urge said lamp socket relative to said reflector.

2. The lamp assembly of claim 1 wherein said two latching hooks are formed opposite each other at said lamp socket.

3. The lamp assembly of claim 1 wherein a stop is provided for each of said latching hooks.

4. The lamp assembly of claim 1 wherein said spring includes two oppositely formed spring legs designed and constructed to symmetrically support said lamp socket at said reflector in cooperation with said latching hooks.

5. The lamp assembly of claim 1 including two plug-in contacts provided in said lamp socket into which contacts of said lighting device can be plugged.

6. The lamp assembly of claim 1 including two contacts provided on said lighting device that can be plugged into said two plug-in contacts.

7. A lamp assembly comprising:

a reflector;

a lamp socket, said lamp socket including two latching hooks, said latching hooks cooperating with said reflector to latch said lamp socket to said reflector;

a lighting device received by said lamp socket;

a spring provided on said lamp socket and abutting said lighting device to urge said lamp socket away from said reflector; and wherein said two latching hooks are provided with a gripping portion.

8. The lamp assembly of claim 7 wherein said gripping portion includes a plurality of ribs.

9. A lamp assembly comprising:

a reflector;

a lamp socket, said lamp socket including two latching hooks, said latching hooks cooperating with said reflector to latch said lamp socket to said reflector;

a lighting device received by said lamp socket;

a spring provided on said lamp socket and abutting said lighting device to urge said lamp socket away from said reflector, said spring including at least two spring legs; and at least one guiding groove receiving each of said spring legs.

10. A lamp assembly comprising:

a reflector;

a lamp socket, said lamp socket including two latching hooks, said latching hooks cooperating with said reflector to latch said lamp socket to said reflector;

a lighting device received by said lamp socket;

a spring provided on said lamp socket and abutting said lighting device to urge said lamp socket away from said reflector; and a wherein said spring is attached to said lamp socket by a snap. connection.

11. A lamp assembly comprising:

a reflector;

a lamp socket, said lamp socket including two latching hooks, said latching hooks cooperating with said reflector to latch said lamp socket to said reflector;

a lighting device received by said lamp socket;

a spring provided on said lamp socket and abutting said lighting device to urge said lamp socket away from said reflector; and wherein said spring is attached to said lamp socket by two hot-caulked plastic pins.

12. A lamp assembly comprising:

a reflector;

a lamp socket, said lamp socket including two latching hooks, said latching hooks cooperating with said reflector to latch said lamp socket to said reflector;

a lighting device received by said lamp socket;

a spring provided on said lamp socket and abutting said lighting device to urge said lamp socket away from said reflector;

a first connecting plate disposed on one of said latching hooks, said spring being electrically connected to said first connecting plate;

a second connecting plate disposed on the other of said latching hooks; and a plug-in contact electrically connected to a second connecting plate.

13. A lamp assembly comprising:

a reflector;

a lamp socket, said lamp socket including two latching hooks, said latching hooks cooperating with said reflector to latch said lamp socket to said reflector;

a lighting device received by said lamp socket;

a spring provided on said lamp socket and abutting said lighting device to urge said lamp socket away from said reflector;

at least two plug-in contacts provided in said lamp socket; and wherein said lighting device is an H7 bulb, said H7 bulb having two contact lugs which are plugged into said plug-in contacts.

* * * * *